US006934260B1

(12) United States Patent
Kanuri

(10) Patent No.: US 6,934,260 B1
(45) Date of Patent: Aug. 23, 2005

(54) ARRANGEMENT FOR CONTROLLING LEARNING OF LAYER 3 NETWORK ADDRESSES IN A NETWORK SWITCH

(75) Inventor: Mrudula Kanuri, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/496,016

(22) Filed: Feb. 1, 2000

(51) Int. Cl.[7] ............................................. H04L 12/28
(52) U.S. Cl. ....................... 370/255; 370/389; 370/401
(58) Field of Search ................................. 370/390, 392, 370/335, 360, 389, 395.1, 401, 469, 255, 370/400, 351, 254; 709/238, 249, 220, 221

(56) References Cited

U.S. PATENT DOCUMENTS

| | | | |
|---|---|---|---|
| 5,953,335 A | | 9/1999 | Erimli et al. |
| 6,256,314 B1 * | | 7/2001 | Rodrig et al. ................ 370/401 |
| 6,262,988 B1 * | | 7/2001 | Vig .............................. 370/401 |
| 6,347,087 B1 * | | 2/2002 | Ganesh et al. ............... 370/392 |
| 6,404,752 B1 * | | 6/2002 | Allen et al. .................. 370/335 |
| 6,414,956 B1 * | | 7/2002 | Szczepanek ................. 370/392 |
| 6,424,659 B2 * | | 7/2002 | Viswanadham et al. ..... 370/469 |
| 6,430,188 B1 * | | 8/2002 | Kadambi et al. ............ 370/398 |
| 6,580,715 B1 * | | 6/2003 | Bare ............................ 370/396 |

2001/0043614 A1 * 11/2001 Viswanadham et al.

* cited by examiner

Primary Examiner—Ajit Patel
(74) Attorney, Agent, or Firm—Manelli Denison & Selter PLLC; Leon R. Turkevich

(57) ABSTRACT

A network switch, configured for performing layer 2 and layer 3 switching in an Ethernet (IEEE 802.3) network without blocking of incoming data packets, includes a switching module for performing layer 2 and layer 3 switching operations, and a plurality of network switch ports, each configured for connecting the network switch to a corresponding subnetwork. One of the switch ports serves as a router interface port for transferring data packets between the network switch and a router. The network switch, configured for performing learning of layer 2 addresses and layer 3 addresses of the data packets, has a learning bit for each network switch port. A host network controller disables the learning bit for the router interface port in compliance with IEEE 802.1d, preventing the switching module from performing any learning of layer 2 or layer 3 addresses for the data packets transferred between the network switch and the router on the router interface port. Hence, the network switch can perform layer 3 switching operations for connected subnetworks, enabling the router to be bypassed; moreover, the disabling of the learning bit for the router interface port ensures that the router traffic does not over overwhelm the layer 2 and layer 3 address table within the network switch.

11 Claims, 3 Drawing Sheets

ARRANGEMENT FOR CONTROLLING LEARNING OF LAYER 3 NETWORK ADDRESSES IN A NETWORK SWITCH

BACKGROUND OF THE INVENTION

1. Field of the Invention

The present invention relates to layer 2 and layer 3 switching of data packets in a non-blocking network switch configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1 q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 switching and layer 3 switching capabilities for faster speed networks such as 100 Mbps or gigabit networks.

However, such design requirements risk loss of the non-blocking features of the network switch, as it becomes increasingly difficult for the switching fabric of a network switch to be able to perform layer 3 processing at the wire rates (i.e., the network data rate). Instances may arise where layer 2 switching requirements adversely affect layer 3 performance. For example, IEEE 802.1d specifies that a layer 2 switch must learn all MAC addresses of the data packets that are received from any of the interfaces, unless the learning of that port is disabled or the switching logic address table is full. Consequently, the addition of layer 3 switching capabilities implies that learning of layer 3 addresses should also be performed; however, care must be taken to ensure that a reasonable address table size may be maintained for a network switch configured for performing both layer 2 and layer 3 processing.

SUMMARY OF THE INVENTION

There is a need for an arrangement that enables a network switch to provide layer 2 switching and layer 3 switching capabilities for 100 Mbps and gigabit links without blocking of the data packets.

There is also a need for an arrangement that provides a reasonable address table size for a network switch configured for performing layer 2 and layer 3 processing.

These and other needs are attained by the present invention, where a network switch has a plurality of network switch ports, one of the switch ports transferring data packets between the network switch and a router. The network switch, configured for performing learning of layer 2 addresses and layer 3 addresses of the received data packets, is configured for disabling any learning of layer 2 or layer 3 addresses for any of the data packets transferred between the network switch and the router on the one switch port.

According to one aspect of the present invention, a method is provided in an integrated network switch having a plurality of network ports and a switching module, the switching module configured for learning network addresses of received data packets. The method includes identifying one of the network switch ports that transfer data packets between the integrated network switch and a router, and disabling learning by the switching module of network addresses for the data packets transferred by the identified one network switch port. The disabling of learning by the switching module of network addresses for the data packets transferred by the one network switch port ensures that router traffic does not overwhelm any switching table having a prescribed size within the network switch and configured for storing layer 3 address information. Hence the network switch can perform layer 3 switching operations for connected subnetworks, enabling the router to be bypassed, while preventing the router from overwhelming any address table within the network switch.

Another aspect of the present invention provides a network switch system. The system includes an integrated network switch having a plurality of network switch ports and a switching module, the switching module configured for learning layer 2 and layer 3 network addresses of received data packets. One of the network switch ports is configured for transferring data packets between the integrated network switch and a router. The system also includes a host controller configured for disabling learning of the layer 2 and layer 3 network addresses of any of the data packets transferred by the one network switch port, based on determining that the one network switch port transfers the data packets between the integrated network switch and the router.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
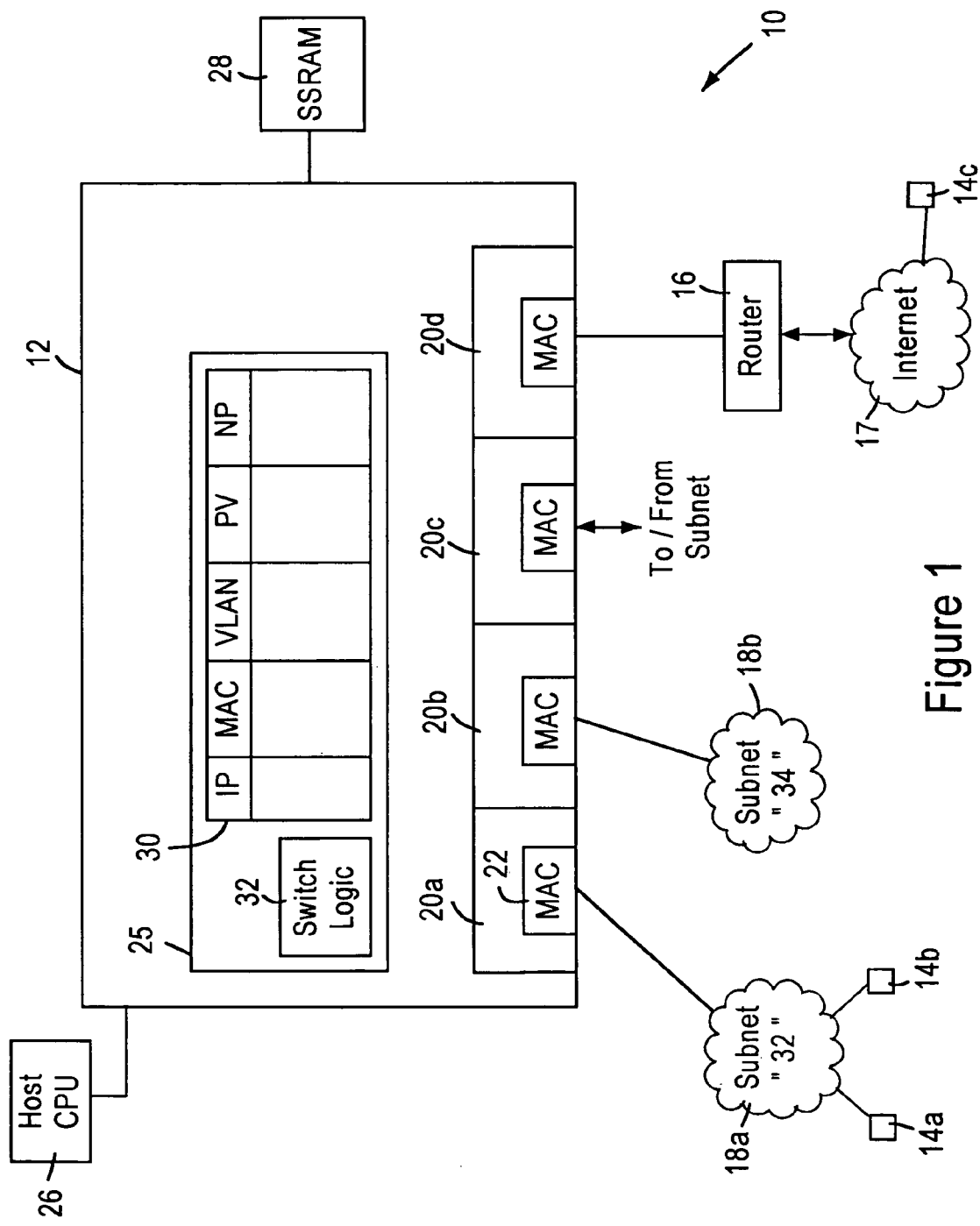
FIG. 1 is a block diagram of a packet switched network having a network switch for switching data packets between subnetworks according to an embodiment of the present invention.

FIG. 1 is a block diagram illustrating a packet switched network 10, such as an Ethernet (IEEE 802.3) network. The packet switched network includes an integrated (i.e., single chip) multiport switch 12 that enables communication of data packets between network stations 14. Each network station 14, for example a client workstation, is typically configured for sending and receiving data packets at 10 Mbps or 100 Mbps according to IEEE 802.3 protocol.

As shown in FIG. 1, the network 10 includes a plurality of subnetworks 18a and 18b, each having a corresponding group of network stations 14 and a unique subnetwork identifier (e.g., "32", and "34", respectively). Each network station 14 within a given subnetwork 18 has a host identifier that enables the transmitting network station 14 to be uniquely identified within the corresponding subnetwork 18.

The switch 12 includes switch ports 20, each including a media access control (MAC) module 22 that transmits and receives data packets to the associated network stations 14 across 10/100 Mbps physical layer (PHY) transceivers (not shown) according to IEEE 802.3u protocol. The switch 12 also includes a switch fabric 25 configured for making frame forwarding decisions for received data packets. In particular, the switch fabric 25 is configured for layer 2 switching decisions based on source address, destination address, and VLAN information within the Ethernet (IEEE 802.3) header; the switch fabric 25 is also configured for selective layer 3 switching decisions based on evaluation of IP address information within the Ethernet packet, described in further detail below.

As shown in FIG. 1, the switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets.

One of the network switch ports 20d, also referred to as a router interface port, is coupled to a router 16 for transfer of data packets between the integrated network switch 12 and an external network 17, such as the Internet, via the router 16. One feature of the network switch 12 is that layer 2 and layer 3 addresses can be learned by the network switch 12 as data packets are received. In particular, the switch fabric 25 includes an address table 30 for storing for each network node a MAC address, an IP address, a virtual local area network (VLAN) identifier, a port vector that specifies the output ports 20 corresponding to the VLAN field, and a numbered port (NP) that specifies the output port 20 for the node having the corresponding IP and MAC addresses. The switch fabric 25 populates the address table 30 as data packets are received from the subnetworks 18a and 18b.

Figure 2:
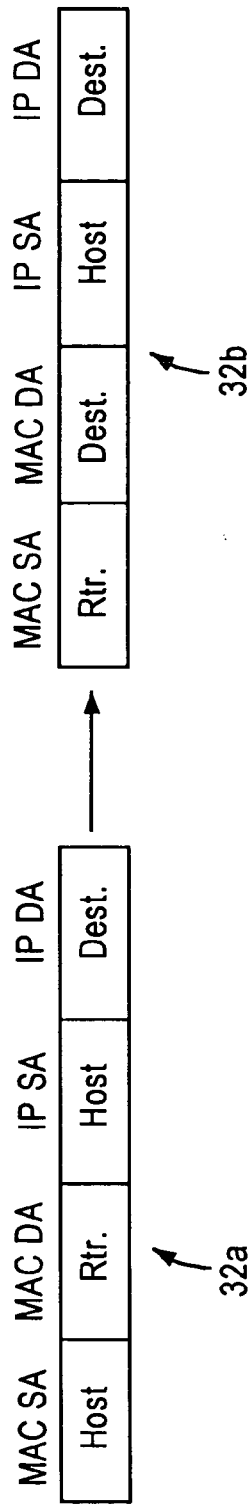
FIG. 2 is a diagram illustrating modification of address fields in an Ethernet (IEEE 802.3) packet by a router.

However, a concern arises that the address table 30 would be quickly overloaded if the network switch 12 was to learn addresses from data packets received from the router 16. In particular, FIG. 2 illustrates the address information in a data packet 32 received by the network switch 12 from the packet switched network 17 via the router 16. The data packet 32a received by the router 16 includes the MAC source address and IP source address of the original transmitting host station 14c, the MAC destination address of the router 16, and the IP destination address of a destination network node, for example node 14a. However when the packet 32 traverses the router 16, the router 16 replaces the MAC source address with the MAC address of the router 16, replaces the MAC destination address with the MAC address of the destination node, and outputs the modified data packet 32 to the router interface port 20d; hence, learning of the received data frame 32b by the switch fabric 25 would be useless, since the MAC source address of the received data frame 32b (router 16) does not match the IP source address (transmitting node 14c).

Similarly, any data packet from one of the subnetworks 18 that is to be sent to the external network 17 will specify the IP address of the destination node 14c as the destination IP address but the MAC address of the router 16 as the destination MAC address, since the network stations in the connected subnetworks 18 rely on the router 16 for routing the data packet through the external network 17.

Hence, any attempt to learn the IP addresses for data packets transferred between the router 16 and the network switch 12 would unnecessarily populate the address table 30 with network addresses that are unusable by the switch fabric 25. However, layer 2 address learning operations as specified under IEEE 802.1d require that a layer 2 switch must learn all MAC addresses of the packets that are coming from any of its interfaces, unless the learning of that port is disabled or the address table 30 is full.

According to the disclosed embodiment, address learning for both layer 2 and layer 3 addresses is deliberately disabled for the router interface port 20d, ensuring that the address table 30 is not populated with address information that is not usable by the switch fabric 25. However, address learning for both layer 2 and layer 3 addresses can be performed on the remaining network switch 20a, 20b, and 20c that are connected to respective subnetworks 18. Hence, the network switch 12 can perform layer 3 processing between connected subnetworks 18, enabling the router 16 to be bypassed; moreover, the disabling of learning for the router interface port 20d ensures that the router cannot overwhelm the address table 30.

Figure 3:
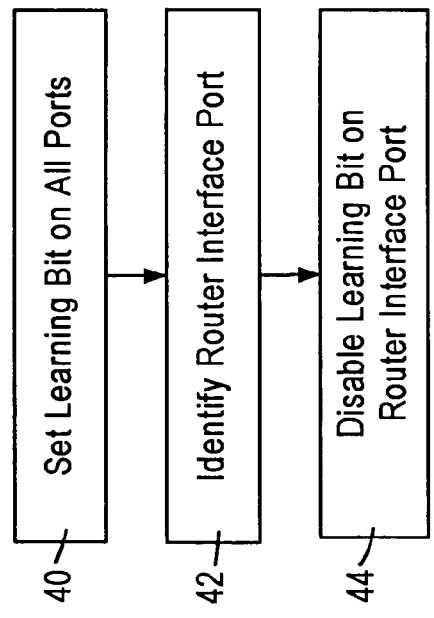
FIG. 3 is a diagram illustrating the method of disabling learning by the switching module of network addresses for data packets transferred by the router interface port of FIG. 1 according to an embodiment of the present invention.

FIG. 3 is a diagram illustrating the disabling of learning by the switching module 25 of data packets transferred between the router interface port 20d and the router 16 according to an embodiment of the present invention. As described above, the host CPU 26 is configured for controlling the network switch 12: each of the network switch ports 20 has a corresponding learning bit which, when set, causes the switch fabric 25 to learn layer 2 and layer 3 addresses of the data packets received by the corresponding switch port 20. Hence, the host CPU 26 begins in step 40 by setting the learning bit on all the ports to "1". The host CPU 26 then identifies the router interface port 20d that is configured for sending and receiving data packets to the router 16 in step 42. The host CPU 26 then disables (i.e., it resets) the learning bit to zero on the router interface port in step 44.

After the learning bit has been disabled on the router interface port 20*d*, the network switch 12 is ready to begin switching data packets.

Figure 4:
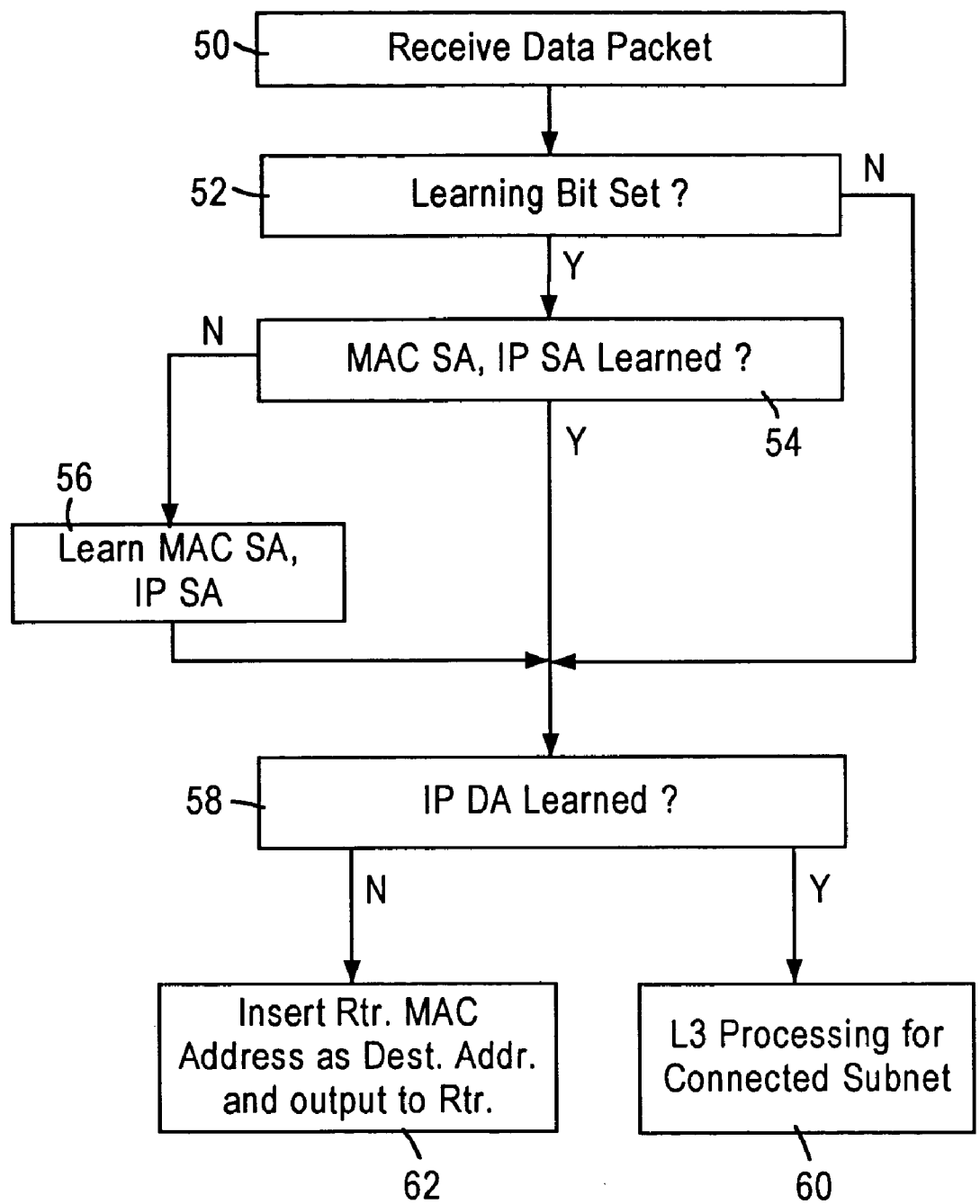
FIG. 4 is a diagram illustrating a method of selective learning by the switching module according to an embodiment of the present invention.

FIG. 4 is a diagram illustrating the selective learning of layer 2 and layer 3 addresses by the switch fabric 25 according to an embodiment of the present invention. In response to receiving a data packet by one of the network switch ports 20 in step 50, the switch fabric 25 checks in step 52 whether the learning bit is set for the corresponding network switch port 20. If the learning bit is set, the switch fabric 25 checks in step 54 whether the MAC source address and the IP source address are learned, i.e., stored in the address table 30; if the switch fabric 25 determines that the MAC source address and the IP source address are not stored in the address table 30, the switch fabric 30 learns the source MAC and IP addresses by storing them in step 56 as a new entry in the address table 30. The switch fabric 25 can continue in step 58 to determine whether layer 3 processing should be performed.

If in step 52 the switch fabric 25 determines that the learning bit is not set (i.e., disabled), the switch fabric 25 ignores the MAC and IP source addresses and directly checks in step 58 whether the IP destination address of the received data packet is stored in the address table 30.

If the switch fabric 25 determines in step 58 that the IP destination address has already been learned, indicating that the IP destination address specifies a network node within one of the connected subnetworks 18, the switch fabric performs layer 3 processing in step 60, enabling the router 16 to be bypassed. However if in step 58 the switch fabric 25 determines that the IP destination address has not already been learned, the switch fabric 25 inserts the MAC address of the router 16 as the destination MAC address in step 62, and outputs the data packet for transfer by the router interface port 20*d* to the router 16.

As readily apparent from the foregoing, the layer 2 and layer 3 addresses are learned only if they belong to the subnetworks 18 directly connected to the switch 12. The learning bit is disabled for the router interface port 20*d*, ensuring that the router traffic does not overwhelm the layer 2 and layer 3 address table 30 while maintaining compliance with IEEE 802.1d. Hence, the network switch 12 can be used to provide layer 3 processing between connected subnetworks 18, enabling the router 16 to be bypassed when possible. Moreover, the disabling of the learning bit for the router interface port 20*d* ensures that any interaction between the network switch 12 and the router 16 does not adversely affect the address table 30. Hence, the address table 30 may be implemented within the switch 12 using a reasonable memory size, for example a memory having 1k (1024) entries.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an integrated network switch having a plurality of network ports and a switching module, the switching module configured for learning network addresses of received data packets, the method comprising:

identifying one of the network switch ports that transfer data packets between the integrated network switch and a router; and disabling learning by the switching module of network addresses for the data packets having passed via the identified one network switch port.

2. The method of claim 1, further comprising learning layer 2 and layer 3 address information by the switching module for data packets transferred by at least two of the network switch ports between respective connected subnetworks.

3. The method of claim 2, wherein the learning step comprises:

receiving a first data packet from a second of the network switch ports configured for transferring data packets between the network switch and a first of the connected subnetworks; and storing in an address table a table entry including a source MAC address and a source IP address from the first data packet, and an identifier of the second network switch port.

4. The method of claim 3, wherein the disabling step includes permanently setting the one network switch port into a nonlearning mode by a host controller, based on the identifying step.

5. The method of claim 3, wherein the learning step further comprises storing in the table entry a virtual local area network (VLAN) identifier and a vector that identifies at least one of the network switch ports to output the corresponding first data packet.

6. The method of claim 1, further comprising:

receiving new data packet on any one of the network switch ports;

determining if the new data packet has a layer 3 destination address stored by the switching module; and forwarding the new data packet to the one network switch port for transfer to the router, based on a determined absence of the layer 3 destination addresses stored by the switching module.

7. The method of claim 1, wherein the disabling step includes:

receiving a data packet by a second of the network switch ports connected to a subnetwork, the data packet having a source media access control (MAC) address, a destination MAC address, a source Internet Protocol (IP) address, and a destination IP address;

learning the source MAC address and a destination MAC address of the received data packet by the switching module;

determining that the one switch port has a learning bit disabled; and disabling learning of the destination IP address of the received data packet based on the determination that the corresponding one switch port has the corresponding learning bit disabled.

8. The method of claim 1, wherein the disabling step includes:

receiving a data packet by the identified one network switch port from the router, the data packet having a source media access control (MAC) address, a destination MAC address, a source Internet Protocol (IP) address, and a destination IP address; and disabling learning of any of the source IP address and a destination IP address based on having received the data packet by the identified one network switch port.

9. A network switch system comprising:

an integrated network switch having a plurality of network switch ports and a switching module, the switching module configured for learning layer 2 and layer 3 network addresses of received data packets, wherein one of the network switch ports is configured for transferring data packets between the integrated network switch and a router; and a host controller configured for disabling learning of the layer 2 and layer 3 network addresses of any of the data packets transferred by the one network switch port, based on determining that the one network switch port transfers the data packets between the integrated network switch and the router.

10. The system of claim 9, wherein the switching module includes an address table configured for storing, for each network node connected to the network switch, a media access control (MAC) address, an Internet Protocol (IP) address, a virtual local area network (VLAN) identifier, and an identifier for one of the network switch ports connected to the corresponding network node.

11. The system of claim 9, wherein the host controller resets a learning bit for the one network switch port, the switching module disabling the learning of the data packets received by the one network switch port in response to detecting the learning bit reset for the one network switch port.

* * * * *